United States Patent
Sudo

(10) Patent No.: US 7,868,968 B2
(45) Date of Patent: Jan. 11, 2011

(54) LIQUID CRYSTAL MODULE

(75) Inventor: Tatsuji Sudo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 194 days.

(21) Appl. No.: 12/356,621

(22) Filed: Jan. 21, 2009

(65) Prior Publication Data

US 2009/0190062 A1    Jul. 30, 2009

(30) Foreign Application Priority Data

Jan. 24, 2008    (JP) ............................. 2008-013235

(51) Int. Cl.
*G02F 1/1333*    (2006.01)
(52) U.S. Cl. ....................................... 349/58
(58) Field of Classification Search ................... 349/58, 349/70
See application file for complete search history.

(56) References Cited

U.S. PATENT DOCUMENTS

2007/0157487 A1    7/2007    Hyun et al.

2007/0188675 A1*   8/2007    Tsubokura et al. ............ 349/58
2007/0195223 A1    8/2007    Nishiyama et al.
2007/0195225 A1*   8/2007    Lee .............................. 349/65

FOREIGN PATENT DOCUMENTS

| JP | 2000-353416 A | 12/2000 |
| JP | 2002-341318 A | 11/2002 |
| JP | 2005-241964 A | 9/2005 |

* cited by examiner

*Primary Examiner*—Richard H Kim
(74) *Attorney, Agent, or Firm*—Global IP Counselors

(57) ABSTRACT

A liquid crystal module includes a rear frame, a panel support, a liquid crystal panel and a bezel. The rear frame has a side plate, a top plate extending outward from the side plate, an outer plate extending rearward from the top plate and a bezel fixing component protruding outward from the top plate with respect to the outer plate. The panel support is disposed on the rear frame and covers the outer plate and the top plate of the rear frame. The liquid crystal panel is disposed on the panel support. The bezel is fixedly coupled to the bezel fixing component of the rear frame and holds an edge portion of the liquid crystal panel on the panel support.

10 Claims, 5 Drawing Sheets

LIQUID CRYSTAL MODULE

CROSS-REFERENCE TO RELATED APPLICATIONS

This application claims priority to Japanese Patent Application No. 2008-013235 filed on Jan. 24, 2008. The entire disclosure of Japanese Patent Application No. 2008-013235 is hereby incorporated herein by reference.

BACKGROUND OF THE INVENTION

1. Field of the Invention

The present invention generally relates to a liquid crystal module. More specifically, the present invention relates to a liquid crystal module having a bezel.

2. Background Information

A conventional liquid crystal module includes a rear frame, a panel support, a liquid crystal panel, a relay board and a bezel. A double side plate is formed by bending a side plate of the rear frame in an inverted U-shape. The panel support is attached to cover a top plate and an outer plate of the double side plate. Edges of the liquid crystal panel are placed on the panel support. The relay board is connected to the liquid crystal panel via a COF (chip-on-film). The relay board is attached to an outer face of the panel support. The bezel holds down the edges of the liquid crystal panel. The panel support and the bezel are fixed by screws. The screws are passed from attachment components of a bezel upper plate of the bezel, through bosses of the panel support, and into the bezel fixing components of the top plate of the double side plate. With the structure, a safe spatial distance is maintained between the bezel side plate and the relay board.

Meanwhile, there is a conventional flat-screen display device in which a control circuit board and an array board of a display panel are connected via a TCP having a flexible wiring board and a drive IC mounted on the flexible wiring board. The flexibility of the TCP allows TCP to be bent and the control circuit board disposed on a non-light emitting side of a light-guide plate. A part of the TCP or a part of the control circuit board is housed in an open area having an acute angle, and supported by a frame. With such arrangements, a liquid crystal display device is made thinner and the size of the frame is reduced (see Japanese Laid-Open Patent Application No. 2000-353416, for example).

Also, there is a conventional flat-screen display device with a narrower frame. In the display device, a bezel cover is fitted to a frame. Screw insertion holes in the bezel cover communicate with screw fastening holes. Shaft parts of fixing screws are inserted into the screw insertion holes and threaded into the screw fastening holes. The bezel cover and the frame are fixed inside a personal computer housing by a side mount method (see Japanese Laid-Open Patent Application No. 2005-241964, for example).

Further, there is also a conventional flat-screen display device having protrusions, which stick out from polarizing plates affixed to upper and lower faces of a liquid crystal cell. The protrusions are fixed by screws along with a metal bezel cover to edges of a backlight and a frame placement component. With such arrangements, the display cell is reliably fixed to the frame or the metal bezel cover even though measures are taken to reduce weight and narrow the frame.

However, as with the conventional liquid crystal module, when the outer plate of the double side plate of the rear frame is formed by bending the plate downward at a position more to the outside than the bezel screw fastening component of the top plate, then the top plate of the double side plate becomes wider, so the relay board ends being located quite far to the outside. If an adequate spatial distance is ensured between the bezel side plate and the relay board, a bezel having a wide bezel upper plate will have to be attached, which makes it difficult to obtain a narrower frame.

In contrast, with the flat-panel display devices of Japanese Laid-Open Patent Application Nos. 2000-353416, 2005-241964 and 2002-341318, a technique for obtaining a narrower frame in a flat-panel display device with a completely different structure from that of the conventional liquid crystal module discussed above is involved. Thus, the technique cannot be applied to obtaining a narrower frame in the conventional liquid crystal module discussed above.

There is also another conventional liquid crystal module in which the bezel side plate is screwed down without screwing down the bezel upper plate. However, a liquid crystal module such as this makes use of a large, thick bezel to compensate for inadequate strength, or a bezel that is integrated in the form of a square frame, so a drawback is higher manufacturing cost.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a liquid crystal module having a narrower bezel.

In accordance with one aspect of the present invention, a liquid crystal module includes a rear frame, a panel support, a liquid crystal panel and a bezel. The rear frame has a side plate, a top plate extending outward from the side plate, an outer plate extending rearward from the top plate and a bezel fixing component protruding outward from the top plate with respect to the outer plate. The panel support is disposed on the rear frame and covers the outer plate and the top plate of the rear frame. The liquid crystal panel is disposed on the panel support. The bezel is fixedly coupled to the bezel fixing component of the rear frame and holds an edge portion of the liquid crystal panel on the panel support.

With the liquid crystal module of the present invention, it is possible to provide a liquid crystal module having a narrower bezel.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
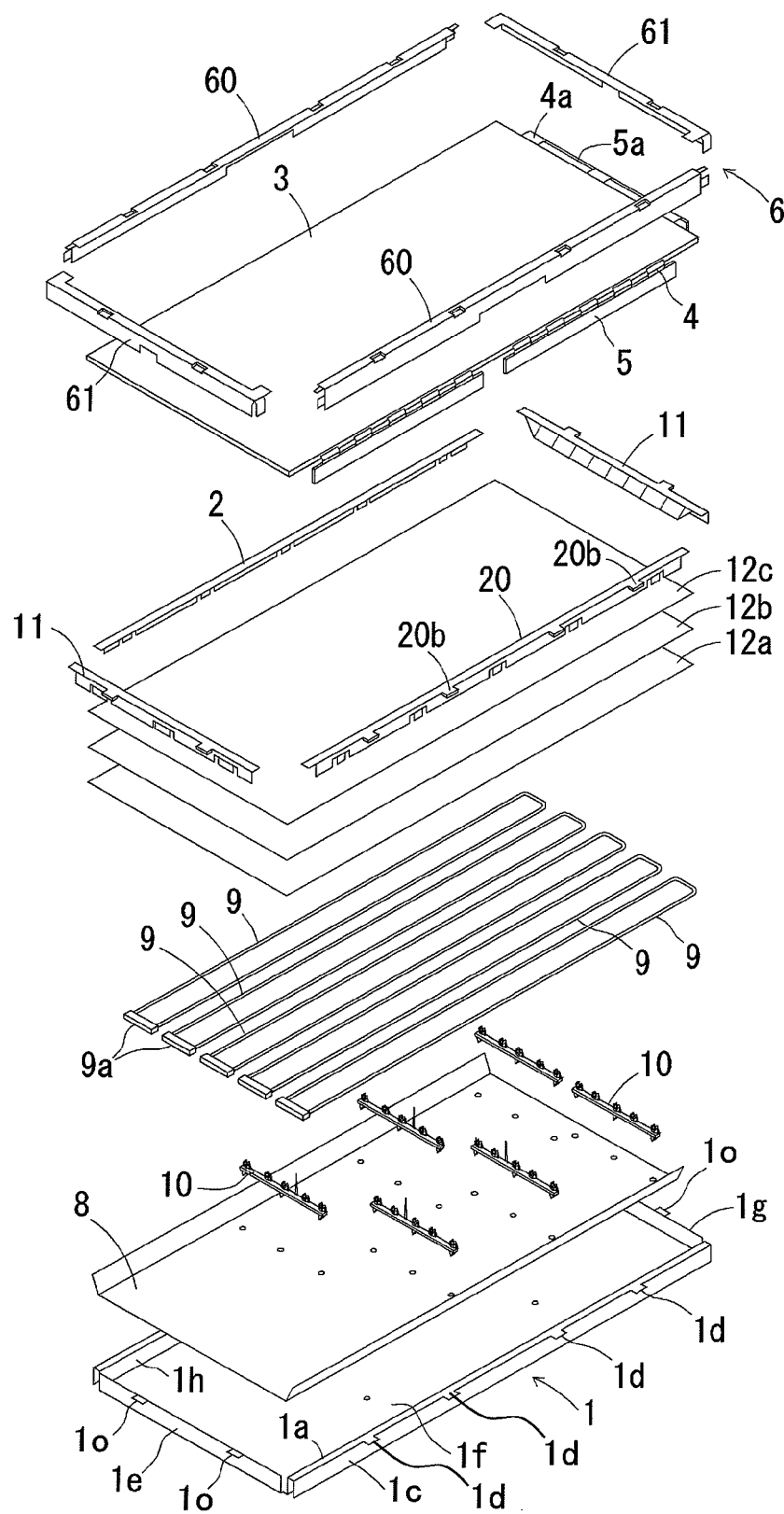
FIG. 1 is an exploded perspective view of a liquid crystal module in accordance with one embodiment of the present invention.
Figure 2:
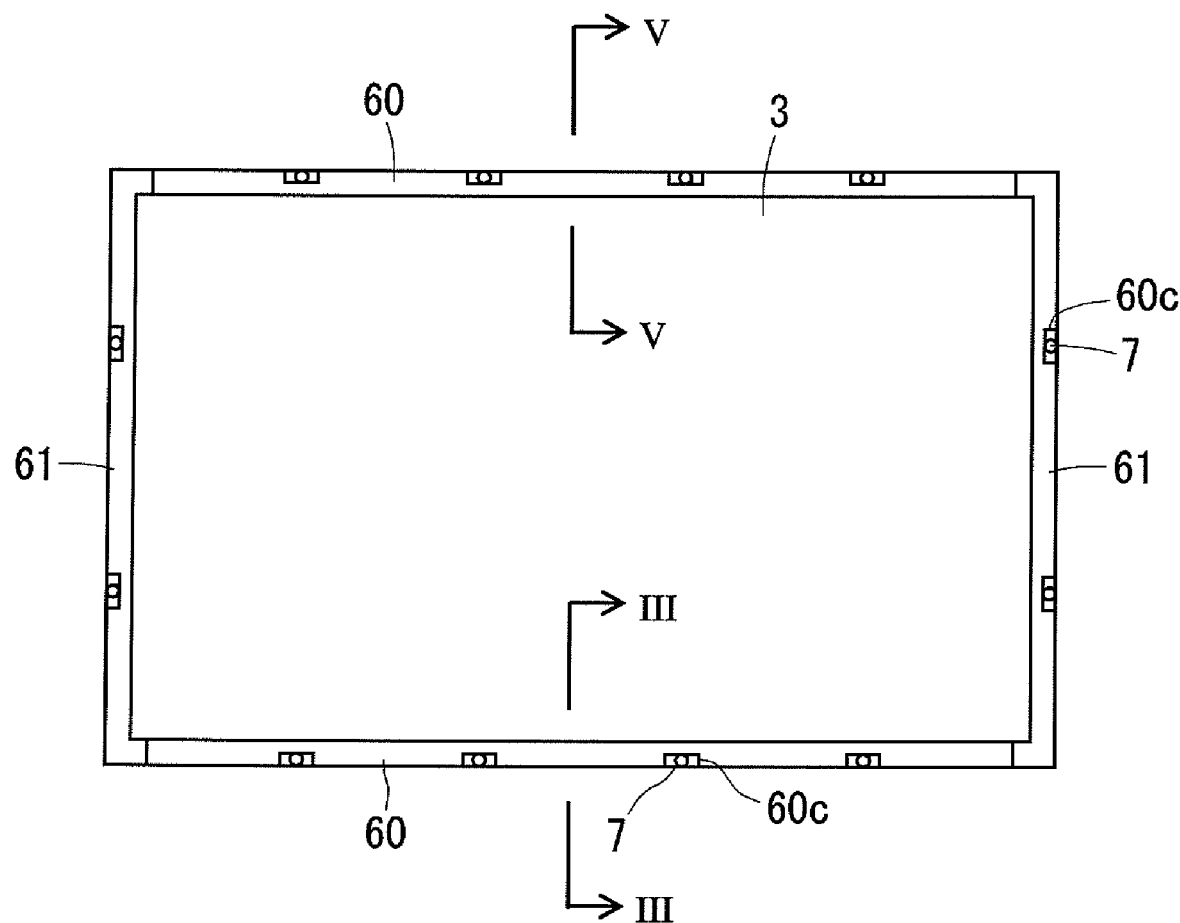
FIG. 2 is a front elevational view of the liquid crystal module illustrated in FIG. 1.

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

As shown in FIGS. 1-5, a liquid crystal module includes a rear frame 1, a pair of panel supports 2 and 20, a liquid crystal panel (e.g., liquid crystal cell) 3, a bezel 6, a plurality of screws 7, a light reflecting sheet 8, a plurality of cold cathode tubes 9, a plurality of lamp holders 10, a pair of lamp frames 11, and a plurality of optical sheets 12a, 12b and 12c. The liquid crystal module is a large liquid crystal module that is installed in large-screen liquid crystal television sets, personal computers, and other electronic devices. The rear frame 1 is made of sheet metal. The rear frame 1 is formed as a one-piece, unitary member. The rear frame 1 includes a bottom plate 1f, a pair of side plates 1e and 1g and a pair of double side plates 1a and 1h. The side plates 1e and 1g extend frontward from short sides of the bottom plate if, and the double side plates 1a and 1h extend frontward from long sides of the bottom plate 1f. The side plates 1e and 1g and the double side plates 1a and 1h define inside of the rear frame 1 surrounded by the side plates 1e and 1g and the double side plates 1a and 1h. Hereinafter, a direction from the inside of the rear frame 1 towards outside of the rear frame 1 is referred to as outward. The light reflecting sheet 8 is provided inside of the rear frame 1. The cold cathode tubes 9 are formed in a U-shape. The cold cathode tubes 9 are arranged in parallel to each other over the light reflecting sheet 8. The cold cathode tubes 9 are supported by the lamp holders 10 attached to the light reflecting sheet 8 and the rear frame 1. Lamp sockets 9a are attached to the ends of the cold cathode tubes 9. The lamp sockets 9a are fitted into and fixed in socket mounting openings formed in the bottom plate 1f along the side plate 1e at one short side of the rear frame 1.

The ends of all of the cold cathode tubes 9 to which the lamp sockets 9a are attached are covered from above by the lamp frame 11 attached to the side plate 1e of the rear frame 1 in order to eliminate the uneven brightness that is caused by shadows from the lamp sockets 9a, etc. U-shaped bent parts at the opposite end of the cold cathode tubes 9 are exposed from the lamp frame 11 attached to the side plate 1g at the opposite end of the rear frame 1 so that the light emitted from the U-shaped bent parts can be utilized more effectively.

Figure 3:
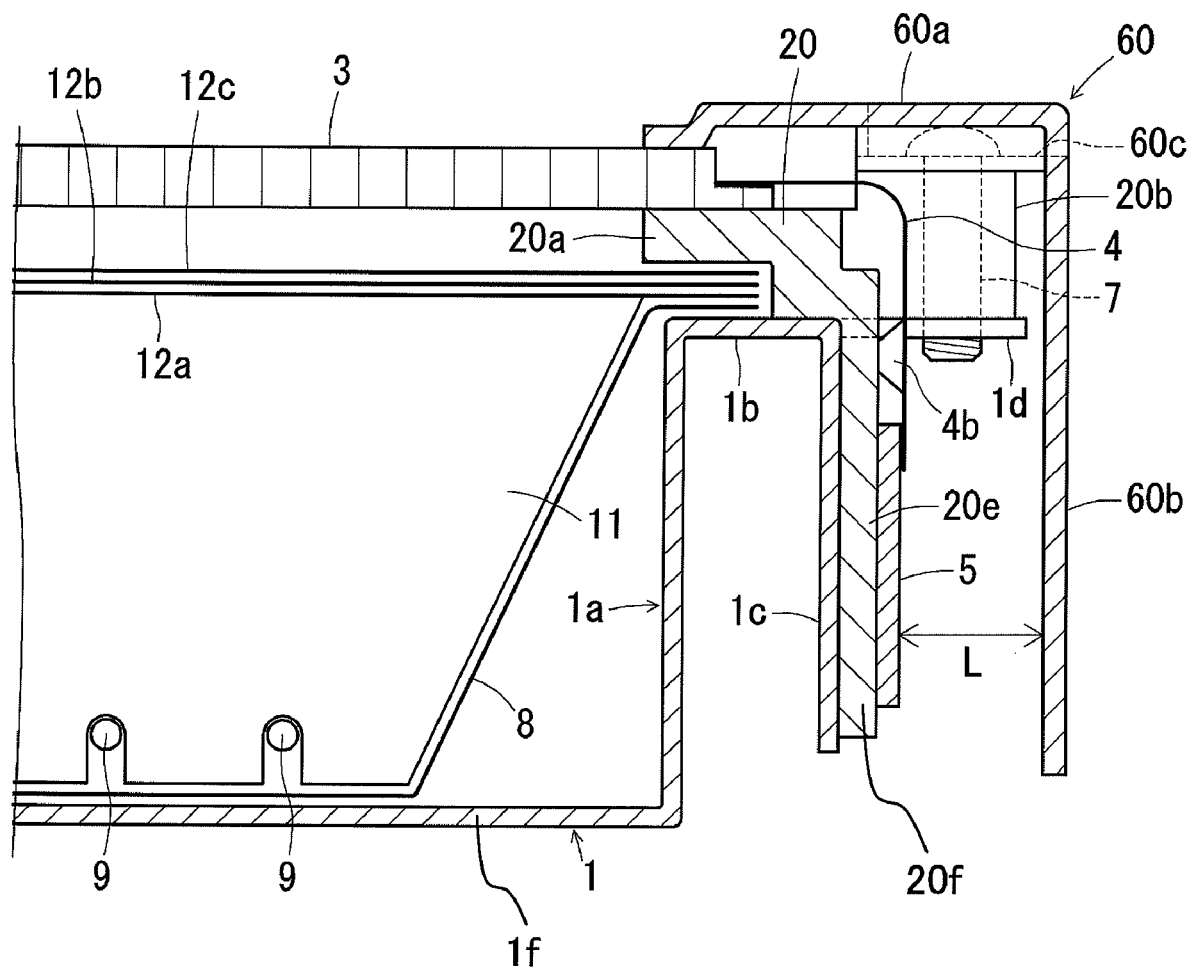
FIG. 3 is a cross section taken along III-III line illustrated in FIG. 2.

The double side plates 1a and 1h on the long sides of the rear frame 1 are both formed as a double side plate structure with an inverted U-shaped cross section by bending the rear frame 1 into an inverted U-shape. For example, as shown in FIG. 3, the double side plate 1a includes a side plate extending frontward from the bottom plate 1f, a top plate 1b extending outward from a front end of the side plate, and an outer plate 1c extending rearward from an outward end of the top plate 1b. The outer plate 1c extends parallel to the side plate of the double side plate 1a. The four edges of three optical sheets 12a, 12b and 12c are placed on upper faces of the double side plates 1a and 1h and upper faces of the lamp frames 11. The optical sheets 12a, 12b and 12c are light diffusing sheets for diffusing light emitted from the cold cathode tubes 9 so that the light shines uniformly over the liquid crystal panel 3. The top two optical sheets 12b and 12c are thin light diffusing sheets, but the lower optical sheet 12a is a light diffusing sheet (e.g., light diffusing plate) that is in the form of a thick panel that is resistant to sagging.

The edges on the long sides of the optical sheets 12a, 12b and 12c are held down by the panel supports 2 and 20 attached to the double side plates 1h and 1a on the long sides of the rear frame 1, respectively. The four edges of the liquid crystal panel 3 are placed over the panel supports 2 and 20 and the lamp frames 11. The lamp frames 11 also serve as panel supports. The bezel 6 includes a pair of long bezel pieces 60 and a pair of short bezel pieces 61. The four edges of the liquid crystal panel 3 are held down and fixed by the long bezel pieces 60 and the short bezel pieces 61. One of the long bezel piece 60 is screwed to bezel fixing components 1d of the double side plate 1a of the rear frame 1. The other of the long bezel piece 60 is screwed to bezel fixing components 1n of the double side plate 1h of the rear frame 1. The short bezel pieces 61 are screwed to bezel fixing components 1o of the side plates 1e and 1g of the rear frame 1. Also, a relay board 5 (X-PCB) is electrically connected to one of the long sides of the liquid crystal panel 3 via a COF (chip-on-film) 4 on which a source-drain IC chip is mounted. A relay board 5a (Y-PCB) is electrically connected to a short side of the liquid crystal panel 3 via a COF 4a on which a gate-driver IC chip is mounted. The relay boards 5 and 5a are fixed to outer faces of the panel support 20 and the lamp frames 11, respectively.

Figure 4:
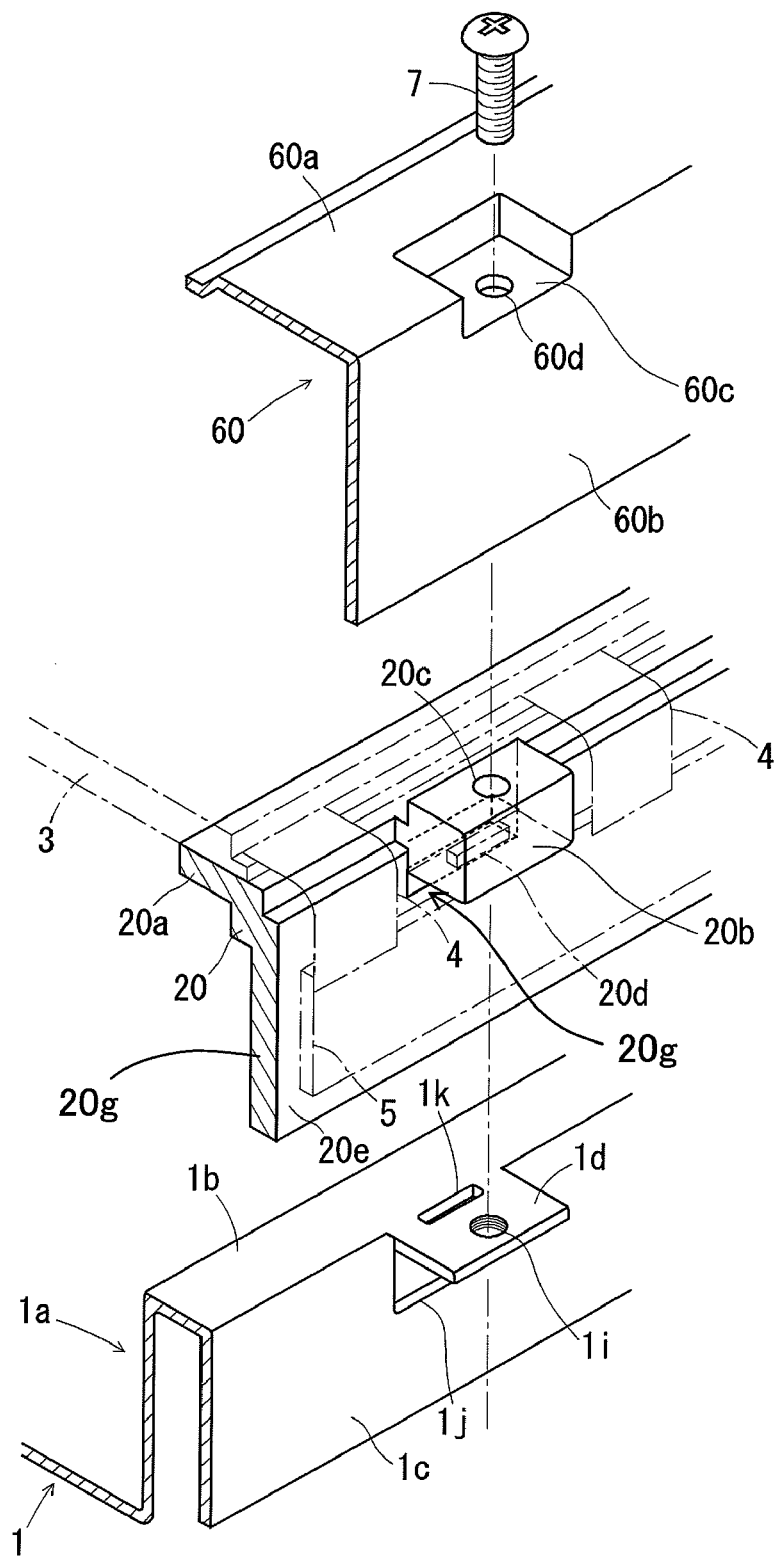
FIG. 4 is an exploded detailed perspective view of the liquid crystal module illustrated in FIG. 1.

As shown in FIGS. 3 and 4, the bezel fixing components 1d of the top plate 1b of the double side plate 1a stick out as tabs past the outer plate 1c. The outer plate 1c is bent downward at a position inward with respect to the bezel fixing components 1d of the double side plate 1a. The bezel fixing components 1d are formed by making cuts 1j in the shape of a tab in the outer plate 1c, and then bending the outer plate 1c downward, and leaving the bezel fixing components 1d unbent. In other words, the bezel fixing components 1d protrude outward from the top plate 1b with respect to the outer plate 1c. The bezel fixing components 1d extend in plane with the top plate 1b. Threaded holes 1i are formed in the bezel fixing components 1d. The screws 7 are threaded into the threaded holes 1i, respectively. As shown in FIG. 1, the bezel fixing components 1d (four in FIG. 1) are formed spaced apart in the lengthwise direction of the double side plate 1a.

When the outer plate 1c of the double side plate 1a is thus bent downward at a position more to the inside than the bezel fixing components 1d, the width of the top plate 1b of the double side plate 1a becomes less than the width of the conventional top plate by at least an amount corresponding to how far the bezel fixing components 1d stick out with respect to the outer plate 1c, and the outer plate 1c is shifted to the inside. In other words, compared to the conventional liquid crystal module in which the outer plate is bent downward at a position outward with respect to the bezel fixing components, the top plate 1b becomes narrower by at least the distance that the bezel fixing components 1d stick out with respect to the outer plate 1c.

The panel support 20 is made of a synthetic resin. The panel support 20 is formed as a one-piece, unitary member. The panel support 20 is attached to cover the top plate 1b and the outer plate 1c of the double side plate 1a. Thus, the width of the panel support 20 becomes smaller than the conventional panel support by the amount how much narrower is the width of the top plate 1b of the double side plate 1a. The panel support 20 includes a support component 20a, a side plate 20f and a plurality of spacers 20b. The support component 20a is formed higher with respect to the top plate 1b to include a step portion therebetween. The support component 20a is disposed on an upper face of the top plate 1b of the double side plate 1a. The side plate 20f extends rearward from the support component 20a and is disposed on an outer face of the outer plate 1c of the double side plate 1a. The spacers 20b are disposed along the support component 20a. The spacers 20b protrude outward from the support component 20a with respect to the side plate 20f. As shown in FIG. 3, the edge of the light reflecting sheet 8 and the edges of the three optical sheets 12a, 12b and 12c are attached by being sandwiched between the support component 20a and the top plate 1b of the double side plate 1a.

As shown in FIGS. 3 and 4, the spacers 20b are formed integrally and protruding outward from the panel support 20. A fastener insertion hole (e.g., through hole) 20c is formed on each of the spacers 20b. The screws 7 are inserted through the fastener insertion holes 20c. The spacers 20b are sandwiched between the bezel fixing components 1d and attachment components (e.g., recessed parts) 60c formed in a bezel upper plate 60a of the bezel pieces 60. Also, a positioning bump 20d is formed on a lower face of each of the spacers 20b. The positioning bumps 20d mate with positioning slits 1k formed in the bezel fixing components 1d. As shown in FIG. 1, the spacers 20b are formed at the same spacing and in the same number as the bezel fixing components 1d in the lengthwise direction of the panel support 20. The panel support 20 further includes slits 20g formed on the side plate 20f at locations corresponding to the bezel fixing components 1d. The bezel fixing components 1d are disposed through the slits 20g of the side plate 20f and positioned rearward with respect to the spacers 20b.

As shown in FIG. 3, the edges of the liquid crystal panel 3 are placed on the support component 20a of the panel support 20. The relay board 5 is fixedly attached to an outer face 20e of the side plate 20f of the panel support 20. The edges of the liquid crystal panel 3 are held down and fixed by the edges of the bezel upper plates 60a.

The bezel pieces 60 are formed by bending sheet metal. As shown in FIGS. 3 and 4, each of the bezel pieces 60 includes the bezel upper plate 60a and a bezel side plate 60b. The bezel side plate 60b is bent downward from one end of the bezel upper plate 60a. The width of the bezel upper plate 60a is reduced according to how much narrower is the width of the top plate 1b of the double side plate 1a of the rear frame 1. A plurality of attachment components 60c are formed at the same spacing and in the same number as the bezel fixing components 1d along one edge of the bezel upper plate 60a (the edge on the bezel side plate 60b side). Each of the attachment components 60c includes an insertion hole (e.g., through hole) 60d. The screws 7 are inserted through the insertion holes 60d of the attachment components 60c.

As shown in FIG. 3, one of the bezel piece 60 is fixed by placing the attachment components 60c on one edge of the bezel upper plate 60a over the spacers 20b of the panel support 20, moving the bezel side plate 60b closer to the distal ends of the bezel fixing components 1d of the double side plate 1a, and threading the screws 7 from the insertion holes 60d of the attachment components 60c, through the fastener insertion holes 20c in the spacers 20b, and into the threaded holes 1i of the bezel fixing components 1d of the double side plate 1a. The result is that the bezel upper plate 60a is stably supported at a constant height by the spacers 20b, and the rear frame 1, the panel support 20, and the bezel piece 60 can all be fastened and fixed together with the screws 7. In other words, the three parts can be easily fastened all together with the screws 7. As a result, assembly work is made easier.

As discussed above, because the liquid crystal module is formed by bending the outer plate 1c of the double side plate 1a downward to the inside of the bezel fixing components 1d, the width of the top plate 1b is reduced and the position of the outer plate 1c is shifted to the inside. When the top plate 1b of the double side plate 1a is thus made narrower, the width of the bezel 6, that is, the width of the bezel upper plate 60a, is correspondingly reduced. When the bezel piece 60 and the panel support 20 whose widths have been correspondingly reduced are attached to the top plate 1b, a sufficient spatial distance L can be ensured between the bezel side plate 60b and the relay board 5 of the outer face 20e of the panel support 20. Furthermore, the bezel piece 60, whose bezel upper plate 60a has been reduced in width, is attached and fixed to the bezel fixing components 1d of the double side plate 1a. As a result, a narrower frame around the liquid crystal panel 3 can be achieved by reducing the width of the bezel piece 60. Also, when the narrower frame is thus obtained, the COF 4 that links the liquid crystal panel 3 and the relay board 5 can be smaller since the position of the relay board 5 moves to the inside. Furthermore, developed surface areas of the rear frame 1 and the bezel piece 60 can be reduced according to the reduction in the widths of the bezel upper plates 60a and the top plate 1b of the double side plate 1a. Thus, less sheet metal has to be used. Moreover, the reduction in the width of the panel support 20 means that less raw material resin has to be used, affording a considerable cost reduction.

Figure 5:
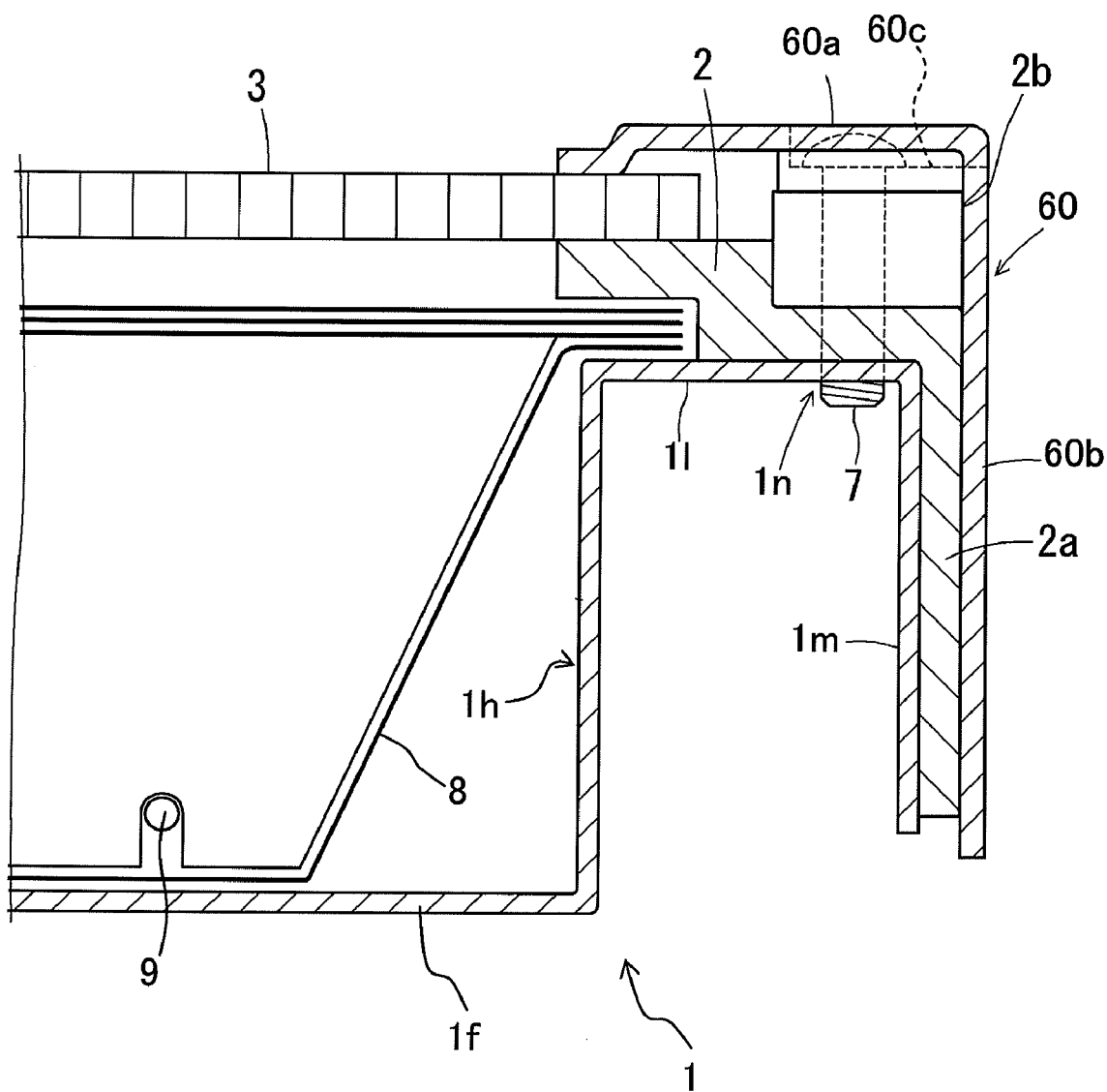
FIG. 5 is a cross section taken along V-V line illustrated in FIG. 2.

As shown in FIG. 5, the double side plate 1h on the opposite side from the double side plate 1a of the rear frame 1 includes a side plate extending frontward from the bottom plate 1f, a top plate 11 extending outward from a front end of the side plate, and an outer plate 1m extending rearward from an outward end of the top plate 11. The top plate 11 has bezel fixing components 1n. The outer plate 1m is bent downward on the outside of the bezel fixing components 1n. The panel support 2 is attached to cover the top plate 11 and the outer plate 1m of the double side plate 1h. The edge of the liquid crystal panel 3 is placed on the panel support 2. The panel support 2 and the bezel piece 60 that holds down the edge of the liquid crystal panel 3 are fixed by screws 7 that are passed from attachment components 60c of the bezel upper plate 60a, through bosses 2b of the panel support 2, and into the bezel fixing components (e.g., bezel screw fastening components) 1n of the top plate 11 of the double side plate 1h. Since the relay board 5 is not attached to the panel support 2 fixed to the double side plate 1h, a narrower frame can be obtained by fixing the bezel piece 60, whose bezel upper plate 60a has been reduced in width, in a state in which the bezel side plate 60b of the bezel piece 60 is moved closer to the outer face of the panel support 2. On the other hand, the double side plate 1h and the panel support 2 can include the same structure as the double side plate 1a and the panel support 20 shown in FIG. 3, respectively. Also, the side plates 1e and 1g on the short sides of the rear frame 1 are both single plates, and the tab-shaped bezel fixing components 1o protrude outward, which means that the bezel pieces 61 with narrower bezel upper plates can be attached. Thus, a narrower frame around liquid crystal panel 3 can be obtained.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A liquid crystal module comprising:
    a rear frame having a side plate, a top plate extending outward from the side plate, an outer plate extending rearward from the top plate and a bezel fixing component protruding outward from the top plate with respect to the outer plate;
    a panel support disposed on the rear frame and covering the outer plate and the top plate of the rear frame;
    a liquid crystal panel disposed on the panel support; and
    a bezel fixedly coupled to the bezel fixing component of the rear frame and holding an edge portion of the liquid crystal panel on the panel support.

2. The liquid crystal module according to claim 1, further comprising
    a relay board electrically coupled to the liquid crystal panel and attached to an outer face of the panel support.

3. The liquid crystal module according to claim 2, wherein the relay board is electrically coupled to the liquid crystal panel via a chip-on film.

4. The liquid crystal module according to claim 3, wherein the side plate, the top plate and the outer plate form a double side plate structure with an inverted U-shaped cross section.

5. The liquid crystal module according to claim 4, wherein the bezel fixing component extends in plane with the top plate.

6. The liquid crystal module according to claim 1, wherein the bezel has a bezel upper plate, a bezel side plate extending rearward from an edge portion of the bezel upper plate with the bezel side plate being disposed outward with respect to a distal end of the bezel fixing component of the rear frame, and an attachment component provided along the edge portion of the bezel upper plate with the attachment component opposing the bezel fixing component of the rear frame and being fixedly coupled to the bezel fixing component.

7. The liquid crystal module according to claim 6, wherein the panel support has a spacer with a through hole, the spacer being disposed between the bezel fixing component of the rear frame and the attachment component of the bezel.

8. The liquid crystal module according to claim 7, wherein the panel support further has a support component and a side plate, with the support component being disposed on the top plate of the rear frame, and the side plate extending rearward from the support component along the outer plate of the rear frame, and
    the spacer of the panel support protrudes outward from the support component of the panel support with respect to the side plate of the panel support.

9. The liquid crystal module according to claim 8, wherein the panel support is integrally formed as a one-piece, unitary member.

10. The liquid crystal module according to claim 7, wherein
    the bezel fixing component of the rear frame includes a tab portion that protrudes outward from the top plate of the rear frame and a threaded hole that is formed on the tab portion,
    the attachment component of the bezel includes a recess portion with a through hole formed on the recess portion,
    the spacer of the panel support is sandwiched between the tab portion of the bezel fixing component and the recess portion of the attachment component, and
    the rear frame, the panel support and the bezel are fixedly coupled with a screw that is disposed through the through hole of the attachment component of the bezel and the through hole of the spacer of the panel support and that is threaded into the threaded hole of the bezel fixing component of the rear frame.

* * * * *